Figure 1:
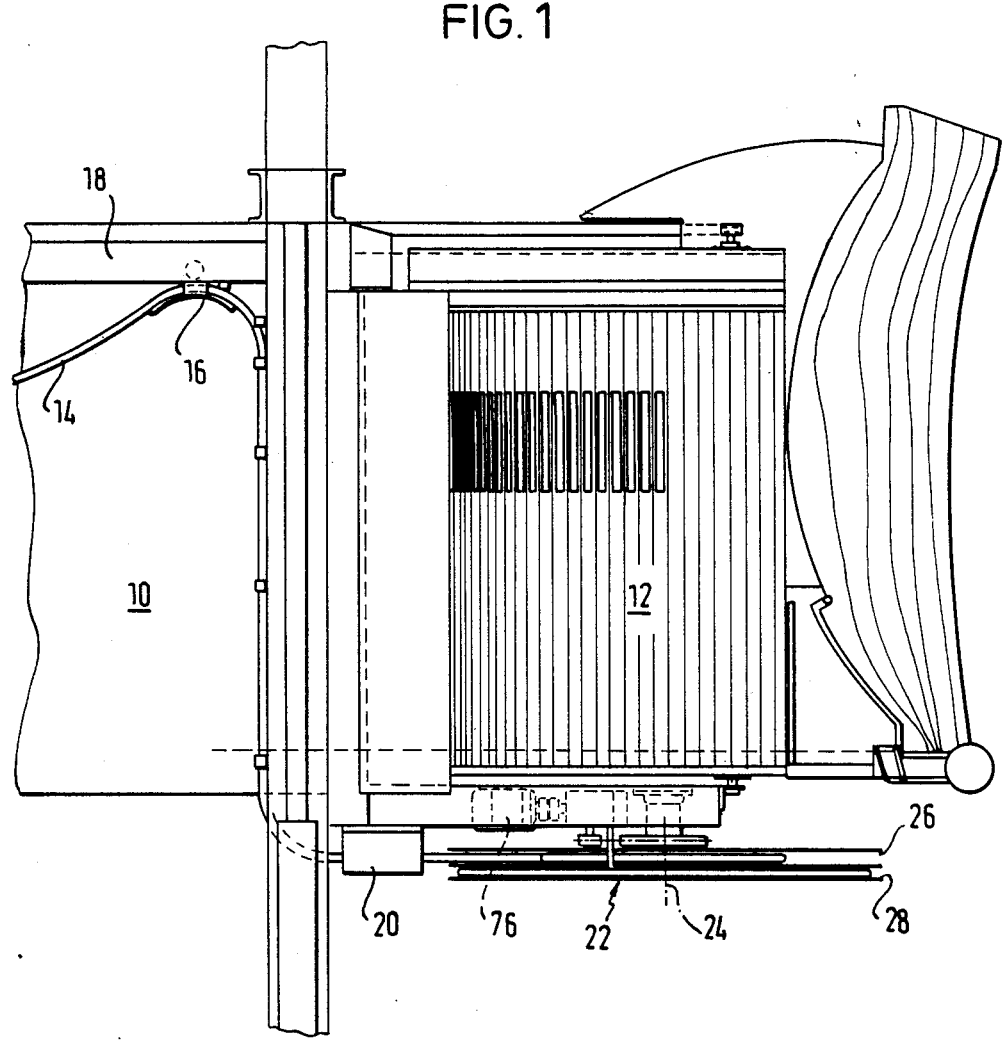

United States Patent [19]

Schabmüller

[11] Patent Number: 4,923,135
[45] Date of Patent: May 8, 1990

[54] STOWING APPARATUS FOR THE CONNECTION CABLE OF A CENTRAL SYSTEM FOR POWER SUPPLY TO AIRCRAFT

[76] Inventor: Heinz Schabmüller, Midgardstr. 20, 8132 Tutzing, Fed. Rep. of Germany

[21] Appl. No.: 577,143

[22] Filed: Feb. 6, 1984

[30] Foreign Application Priority Data

Feb. 8, 1983 [DE] Fed. Rep. of Germany ....... 3304276

[51] Int. Cl.⁵ .................... B65H 75/34; H02G 11/02
[52] U.S. Cl. ............................ 242/54 R; 191/12.2 A
[58] Field of Search ................. 191/12.2 R, 12.2 A, 191/12.4; 242/54 R, 107.1, 86, 86.1, 77

[56] References Cited

U.S. PATENT DOCUMENTS

| | | | |
|---|---|---|---|
| 1,171,745 | 2/1916 | Mundy | 191/12.2 R |
| 1,464,168 | 8/1923 | Booth et al. | 191/12.2 R |
| 2,090,707 | 8/1937 | Sloane | 191/12.2 A |
| 2,219,201 | 10/1940 | Smith | 191/12.2 R |
| 2,777,646 | 1/1957 | Manahan | 242/86 |
| 3,773,987 | 11/1973 | Davis et al. | 191/12.4 |
| 3,959,608 | 5/1976 | Finlayson et al. | 191/12.2 R |
| 3,976,260 | 8/1976 | Irik | 242/77 X |
| 4,053,118 | 10/1977 | Aikins | 191/12.2 R X |
| 4,080,291 | 3/1978 | Sturgill | 191/12.2 R X |
| 4,154,324 | 5/1979 | Upton et al. | 191/12.2 R |
| 4,284,180 | 8/1981 | Masters | 191/12.2 R |
| 4,436,190 | 3/1984 | Wentzell | 191/12.2 R |

FOREIGN PATENT DOCUMENTS

| | | |
|---|---|---|
| 603390 | 9/1934 | Fed. Rep. of Germany . |
| 955334 | 1/1957 | Fed. Rep. of Germany . |
| 2738047 | 2/1978 | Fed. Rep. of Germany . |
| 7811922 | 3/1978 | Fed. Rep. of Germany . |
| 3128545 | 2/1983 | Fed. Rep. of Germany . |
| 3133842 | 3/1983 | Fed. Rep. of Germany . |
| 106329 | 12/1923 | Switzerland . |
| 628860 | 3/1982 | Switzerland . |

OTHER PUBLICATIONS

Dollenmayer, W. L., Cable Storage Reel, IBM Technical Disclosure Bulletin, vol. 6, No. 7, Dec. 1963.

Primary Examiner—Harvey C. Hornsby
Assistant Examiner—Scott J. Haugland
Attorney, Agent, or Firm—Ostrolenk, Faber, Gerb & Soffen

[57] ABSTRACT

A stowing apparatus for the connection cable of an airport central system for power supply to aircraft is constructed in the form of a double drum (22), said drum comprises a takeup or coiling drum (28) for the length of the connection cable to be run out and a compensating drum (26) coaxial therewith from which the cable is led to a fixed connection of the bridge head of the gate. On the compensating drum (26) a compensating length of the cable is loosely wound in such a manner that the spiral of the compensating length on rotation of the drum and uncoiling and coiling of the connection cable moves radially from the outside to the inside and from the inside to the outside respectively, radially extending support bearings (44) being provided to reduce friction. In this manner the necessary revolutions of the coiling drum (28) are compensated by the spiral of the cable compensation portion. The drive of the double drum is by an electric motor (76) and transmission gearing (78 and 82) in such a manner that a drum speed of about 6 rpm results.

5 Claims, 3 Drawing Sheets

STOWING APPARATUS FOR THE CONNECTION CABLE OF A CENTRAL SYSTEM FOR POWER SUPPLY TO AIRCRAFT

The invention relates to a stowing apparatus for the connection cable of an airport central system for power supply to aircraft. Such stowing equipment is necessary for the central aircraft power supply systems which have been recently introduced in airports. For economic and sound protection reasons, the stowing equipment is increasingly used instead of the previously employed diesel generators or the on-board generators.

The power supply cables necessary for this purpose have for example a diameter of 46 mm and apart from 4 cable conductors for the 400 H set for the three-phase contain 20 to 30 control lines. They are therefore heavy and difficult to stow, in particular because the requirement must be met that these power cables are led to the plug connection of the aircraft without slip ring means or intermediate adapter plugs.

To permit connection to all aircraft types in use today a useful length for the connection cable of about 18 m is necessary and it is required that this cable length is accommodated in a protected manner when not in use in the vicinity of the bridgehead of the gate and can be rapidly and easily run out to the particular length required. It is known to stow the cable by guiding the length thereof to be run out by several loose or fixed pulleys or rollers which can be raised and lowered as required in order to be able to vary the horizontal direction the cable length is to be run out. Such stowing apparatuses require a great overall height.

The problem underlying the invention is therefore to provide a compact cable stowing apparatus with fixed connection which makes available the necessary free cable length and ensures rapid and easy running in and out.

The problem is solved by the features set forth in the characterizing clause of claim 1.

It is achieved by the invention without any twisting of the cable at any point. The drum rotations necessary for coiling and uncoiling are accommodated simply by changing the curvature diameter of the convolutions of the compensation cable length. However, perpendicular to its longitudinal axis such a cable is inherently flexible up to a certain radius of curvature so that even after long periods of use there is no danger of damage to the cable. The maximum and minimum diameters of the resulting spiral convolutions must be adapted to the particular cable employed.

Although DE-A-31 28 545, DE-GM 78 11 922 and US-A-18 68 409 disclose cable drums without slip ring means and with fixed connection in which a compensation cable length can be spread and contracted spirally, these drums are suitable only for relatively thin lines, for example measuring lines or 220V mains cables which can be aligned against the force of a return spring. Even if correspondingly dimensioned these drums are not suitable for the heavy supply cables of central supply systems for aircraft.

Figure 2:
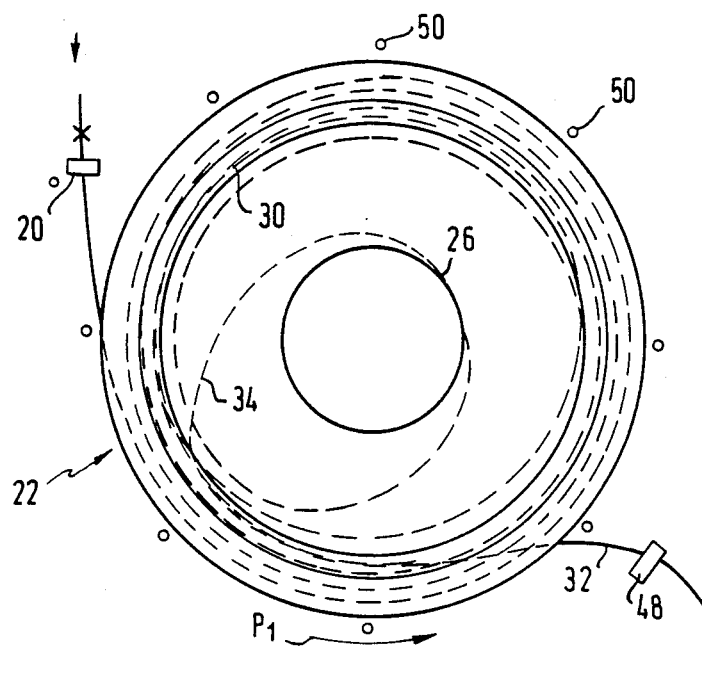
Figure 3:
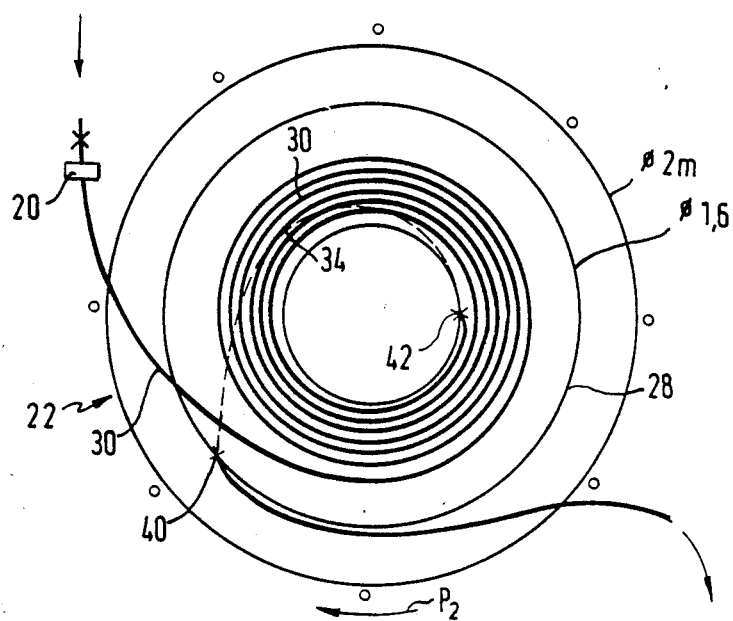
Figure 4:
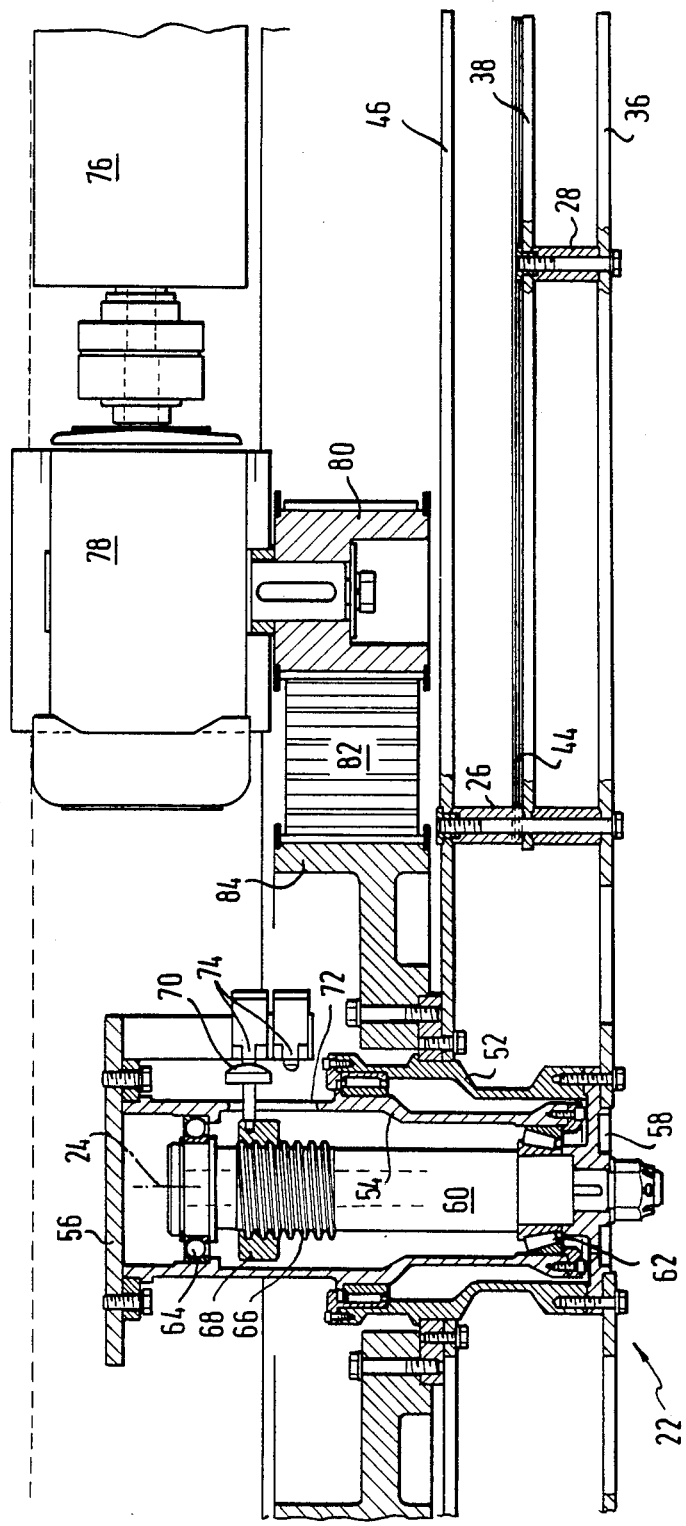

Hereinafter, an example of embodiment of the invention will be described with the aid of the drawings, wherein:

FIG. 1 is a view of the bridge head of a gate having the cable stowing apparatus according to the invention, FIG. 2 is a schematic axial view of the cable stowing apparatus according to FIG. 1 with coiled connection cable, FIG. 3 is a schematic view corresponding to FIG. 2 with uncoiled connection cable, and FIG. 4 is a sectional view to a larger scale of the cable stowing apparatus.

FIG. 1 shows a gate 10 with bridge head 12 as used in airports for passenger entry and exit. The gate 10 can be extended with the bridge head 12 and is vertically adjustable to enable the bridge head to be brought up to the opened door of the aircraft. Depending on the aircraft type considerable height differences have to be overcome. Between landing and takeoff aircraft on the ground require an electrical connection for power supply which depending on the aircraft type must be designed for a power of about 70 to 100 kVA. This power is supplied by a central 400 Hz generator or several generators to the aircraft via a cable 14 which runs along the gate and is led with cable suspension means 16 in rails 18 to compensate length differences on extension and retraction of the gate which is extendable in telescopic manner between the stationary pier head and the bridge head to enable the latter to be brought up to any type of aircraft. This supply cable 14 is led to a connection box 20 beneath the bridge head 12 and it is required that this cable 14 can be led via the connection box 20 up to the plug-type connection for the aircraft without any intermediate plug-type connections or slip rings. Between the connection box and the connection for the on-board network a connection cable must be provided which depends on the aircraft type and must be run out a length of about 18 m. This connection cable fixedly connected to the supply cable 14 has a diameter of about 46 mm and comprises 4 conductors for the power supply and a further 20 to 30 control lines; although it has a certain flexibility which permits coiling on a drum twisting of the cable and radii of curvature which are too small must be avoided.

The connection cable between the connection box 20 and the aircraft is to be stored in compact manner when not in use. According to the invention this is done by a cable coiling apparatus 22 which is disposed protected from the weather beneath the bridge head 12 of the gate and consists of a double drum which is rotatable in both directions about a vertical axis 24 by a power drive. This cable coiling or takeup apparatus can also be set up at a location at the edge of the apron or other area of the airport where aircraft are parked after landing. The double drum 22 comprises an upper compensation drum 26 and a lower coiling or takeup drum 28 fixedly connected thereto. Wound in one layer on the compensation drum is the compensating length 30 of the connection cable and on the coiling drum 28 the coil length of the connection cable is wound, the uncoilable length thereof being about 18 m. The cable is led in an arc 34 (FIGS. 2 and 3) from the compensation drum to the coiling or takeup drum.

As apparent from FIG. 2, the coiling length 32 of the connection cable is wound in the form of a single-layer spiral on the coiling drum 28 between the lower drum flange 36 and the upper drum flange 38 (FIG. 4). The diameter of the takeup drum 28 is about 160 cm so that for three revolutions about 18 m of cable can be wound. From a fixed point 40 of the coiling drum 28 the arc portion 34 leads to a fixed point 42 at the periphery of the compensating drum 26 whose diameter corresponds to the permissible curvature of the cable. In the embodiment illustrated the diameter of the compensating drum 26 is about 65 cm and on this compensating drum a compensation cable section with a length of about 12 m is rolled in spiral manner in one layer. The individual convolutions of this compensation cable length 30 are displaceable radially under low friction on radial support bearings 44 of the flange 38, that is between the drum flange 38 and the upper drum flange 46.

The uncoiling direction is indicated in FIG. 2 by the reference numeral $P_1$. From the position according to FIG. 2 the coiling length 32 of the connection cable can be withdrawn via the roller passage 48 to such an extent that the cable end can be inserted with its plug-type connector in the plug connection of the aircraft. As apparent from FIG. 2 the cable compensation length 30, when the coiling length is wound up, lies at the outer periphery between the flanges 46 and 38, stops 50 at the outer flange portion stopping the cable compensation length from wandering outwards between the flanges 46 and 38. If when uncoiling the coil length 32 in the direction of the arrow $P_1$ the double drum according to FIG. 2 is rotated counterclockwise, the compensation length 30 of the cable is drawn radially in retained spiral form inwardly and wound onto the periphery of the coiling drum 28 in the form of a spiral. The compensation portion 30 must be so long that the coiling length 32 of the connection cable can be completely uncoiled from the drum 28 before the compensation portion is completely wound with its entire length closely on the compensating drum 26. The compensation length then has the form shown in FIG. 3, the spiral comprising 6 convolutions.

The coiling operation takes place in the reverse direction and for this purpose the double drum 32 is rotated in the direction of the arrow $P_2$ according to FIG. 3. On this rotation according to FIG. 3 in the clockwise direction the cable is wound with its coiling length 32 onto the drum 28 and by the forces exerted by the movement of the compensating drum 26 the compensation length 30 of the cable is carried radially outwardly on the support bearings 44 until the position according to FIG. 2 is reached.

According to the embodiment illustrated the coiling length and the compensation length of the connection cable are wound in opposite senses on their drums. However, it would also be possible to effect this winding in the same direction and in this case when winding on the connection cable the spiral of the compensation cable length would move from the inside to the outside whilst on coiling a radial movement of the spiral would take place from the outside to the inside.

As apparent from FIG. 4 the drums 26 and 28 are carried by a hub 52 which is rotatable about a central bearing sleeve or bush 54 which is disposed on a bottom plate 56 beneath the bridge head 12 of the gate. The hub 52 is closed by a cover flange 58 which carries a central shaft 60 which is supported in the bush 54 via a lower roller bearing 62 and an upper ball bearing 64. On the spindle thread 66 of the spindle shaft 60 is a nut 68. Screwed radially into the nut 68 is a head screw 70 whose shank is led in a axial slot 72 of the bush 54. Consequently, on rotation of the spindle 66 the nut therefore moves in the vertical direction and in the end positions the head screw 70 actuates the limit switch 74.

The drive is by an electric motor 76 via a worm mechanism 78 whose driven pinion 80 drives via a toothed belt 82 a pulley 84 which is fixedly connected to the double drum 22. The drive motor 78 may also be constructed as gear motor.

The worm mechanism 78 has a transmission ratio of 63:1 and reduces the speed of rotation of the drive motor to 24 rpm. The toothed belt drive 80, 82 comprises a reduction ratio of 4:1 so that the double drum is rotated at a speed of 6 rpm. The control of the motor is from the bridge head or via control lines from any desired point, in particular the cable end carrying the plug-type connection for the aircraft. This makes one-man operation possible.

According to the embodiment described above the two drums, i.e. the coiling drum 28 and the compensating drum 26, are axially offset with respect to each other. It is however possible to arrange the drums one within the other, the compensating drum then being the inner drum and the spiral compensation of the compensating length taking place within the space between the compensating drum and coiling drum in the cavity therebetween.

I claim:

1. A power supply connection to an airport central power station; a portion of said airport having a gate 10, said gate having a bridge head 12; a connection box 20 at said bridge head and a connecting cable 14 from said power station through said connection box to said bridge head; cable stowing and coiling apparatus 22 at said bridge head to store and control said cable as it is run out to an aircraft; said cable having a plug type connection at its free end adapted to cooperate with a corresponding connector at an aircraft; said cable stowing apparatus comprising cable coiling apparatus 22 having a pair of drums; one of said drums being a coiling drum and the other of said drums being a compensating drum on which the cable is stored without twisting; said cable stowing and coiling apparatus 22 being suspended beneath said bridge head 12 of said gate 10 with its axis 24 extending vertically; and a motor 26 connected to and adapted to drive said drums in both directions of rotation around said axis.

2. Apparatus according to claim 1, characterized in that the cable being capable of being reeled from a smallest diameter of curvature to its largest diameter of curvature and the coiling diameter of the compensating drum (26) corresponds to the smallest diameter of curvature of the cable.

3. Apparatus according to claim 1, characterized in that the cable has two lengths thereof extending from said stowing and coiling apparatus, said lengths being wound in opposite senses on the compensating drum (26) and coiling drum (28) respectively and that the lengths of cable on said compensating drum constituting a compensating spiral (30) which moves during uncoiling radially from the outside to the inside and, during coiling, radially from the inside to the outside.

4. The power supply connection of claim 1, wherein a compensating drum is provided coaxial with said first-mentioned drum, said cable extending over an arcuate path from said first-mentioned drum to said compensating drum, said compensating drum comprising radially extending bearings and the radially inner convolutions of the compensating cable link on said compensating drum and the cable length on said first-mentioned drum merge into each other over said arcuate path.

5. The power supply connection of claim 1, wherein said compensating drum comprises radially extending bearings for radially displacing convolutions of the portion of said cable wound thereon.

* * * * *